Feb. 20, 1940.   H. BOYD   2,190,930

CONTAINER FOR ICE CREAM SUNDAES

Filed Oct. 3, 1938

Inventor

Harry Boyd

By Clarence A. O'Brien
and Hyman Berman
Attorneys

Patented Feb. 20, 1940

2,190,930

UNITED STATES PATENT OFFICE 2,190,930

CONTAINER FOR ICE CREAM SUNDAES

Harry Boyd, Mercer, Pa.

Application October 3, 1938, Serial No. 233,111

5 Claims. (Cl. 229—5.5)

This invention relates to containers for prepared ice cream sundaes, and has for the primary object the provision of an inexpensive and sanitary device of the above stated character whereby a flavoring or syrup or syrup and fruit mixed with each other and ice cream may be brought together in the form of a sundae and sold to the trade for consumption off of the premises of the seller and obtainable from the container by the purchaser either by removing the lid or bottom of the device, and which will be extremely easy to handle, sanitary and provide a low cost of distribution and permit a more uniform sundae as to quality and amount to be obtained by the consumer.

With these and other objects in view, the invention consists in certain novel features of construction, combination and arrangement of parts to be hereinafter more fully described and claimed.

Figure 1:
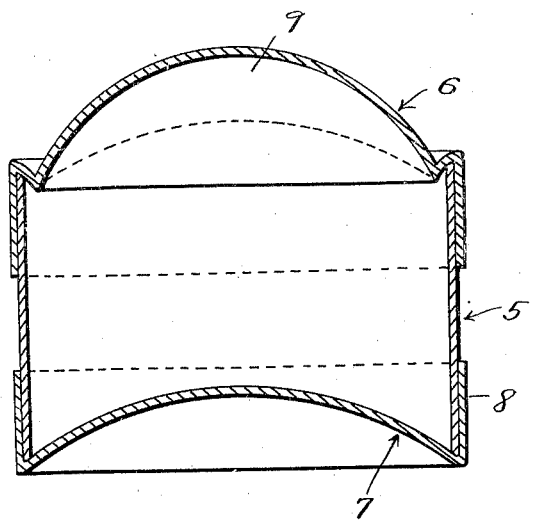

For a complete understanding of my invention, reference is to be had to the following description and accompanying drawing, in which Figure 1 is a vertical sectional view illustrating a container constructed in accordance with my invention.

Figure 2:
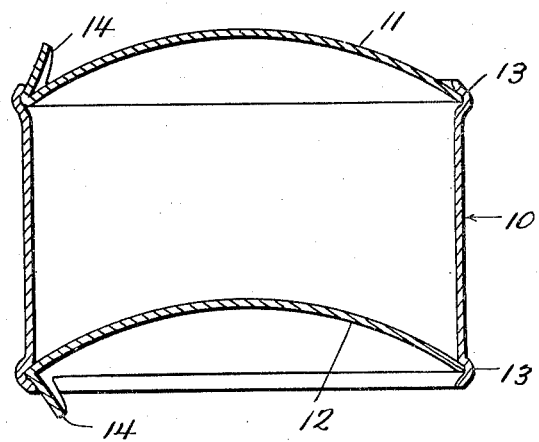

Figure 2 is a vertical sectional view illustrating a modification of the invention.

Referring in detail to the drawing, the numeral 5 indicates the body of the device which is of tubular shape forming the main portion of the container. One end of the body 5 is closed by a cover or lid 6 while the other end of the body 5 is closed by a bottom 7. The cover 6 and the bottom 7 are provided with retaining flanges 8 adapted to have frictional fit with the body 5 of the container when the device is assembled.

As shown in Figure 1, the cover or lid 6 may include a dome-shaped portion 9 providing therein a chamber to receive a flavoring or syrup or syrup and fruit mixed or other combinations of ingredients employed in the making of ice cream sundaes. The flavoring or like ingredients are placed in the cover or lid when the latter is in an inverted position and may be frozen if desired. The body 5 is then positioned on the cover or lid and filled with ice cream. The bottom 7 is then applied to the body 5. The device then contains the makings of an ice cream sundae and may be readily stored and kept in a frozen condition, also will be convenient to ship and easily handled by the seller to the consumer. The consumer may readily carry the device in entirety to any place desired and obtain the contents by simply removing either the bottom or the lid. When the bottom is removed it is preferable that the contents be served on a dish or the like. However, when the cover or lid is removed the contents then may be eaten from the device.

While I have described that the cover or lid includes the dome-shaped portion 9, it may be of other shapes to form a chamber to receive the flavoring which go to make up an ice cream sundae with the ice cream or if desired the cover or lid may be substantially flat. As shown in Figure 1 the bottom also includes a dome-shaped portion which extends upwardly into the body 5.

Referring to my modified form of the invention as shown in Figure 2, the body is indicated by the character 10, the cover or lid by the character 11 and the bottom by the character 12. In this instance, the cover or lid 11 and the bottom 12 are of substantially dome-shape with the dome of the bottom extending upwardly in the body 10 and the dome of the lid or cover extending above the body 10. The body 10 is of cylindrical formation and adjacent its ends is provided with internal grooves 13 in which may snap the edges of the cover and the bottom. The cover and bottom are provided with lips or ears 14 to facilitate the removal of these parts from the body 10.

A suitable waterproof lining (not shown) may be arranged in the cover or lid prior to placing the flavoring therein. This lining may be made of Cellophane or any other material suitable for the purpose. Also it is to be understood that the container described in detail and shown in the drawing may be made of paper or a composition of materials or of glass if desired.

It is believed that the foregoing description, when taken in connection with the drawing, will fully set forth the construction and advantages of this invention to those skilled in the art to which such device relates, so that further detailed description will not be required.

Having thus described my invention, what I claim is:

1. A container for prepared sundaes comprising a body, a removable bottom for said body and a removable lid for said body and including a chamber arranged outwardly of the body for receiving flavoring to combine with ice cream filling said body to make a sundae.

2. A container for prepared sundaes comprising a tubular body, a bottom removably mounted on one end of said body, and a lid removably mounted on the other end of the body and including an offset portion arranged exteriorly of the body to form a chamber for the reception of flavoring employed with ice cream arranged in the body in forming a sundae.

3. A container for prepared sundaes comprising a tubular body, a lid for said body and including a dome-shaped portion arranged to extend outwardly of the body to form a chamber to receive a sundae flavoring to cooperate with ice cream arranged in the body and forming a sundae, and a bottom for said body and including a dome-shaped portion extending inwardly of the body.

4. A container comprising a tubular body, a lid including a dome-shaped portion and a marginal flange to have frictional fit with the body with the dome-shaped portion arranged outwardly of the body and providing therein a chamber to receive a sundae flavoring, and a bottom including a marginal flange to frictionally fit the body and a dome-shaped portion extending inwardly of the body.

5. A container comprising a tubular body having internal grooves adjacent its ends, a bottom and a lid receiver by the grooves and each of dome-shape with the dome portion of the bottom extending into the body and the dome portion of the lid extending outwardly of the body, and tabs formed on the bottom and the lid and arranged exteriorly of the body.

HARRY BOYD.